United States Patent [19]

Tauvron et al.

[11] Patent Number: 5,195,622
[45] Date of Patent: Mar. 23, 1993

[54] LOCK-UP CLUTCH FOR A HYDROKINETIC POWER TRANSMISSION APPARATUS FOR A MOTOR VEHICLE

[75] Inventors: Fabrice Tauvron, Creteil; André Dalbiez, Argenteuil, both of France

[73] Assignee: Valeo, Paris, France

[21] Appl. No.: 854,407

[22] Filed: Mar. 19, 1992

[30] Foreign Application Priority Data

Mar. 22, 1991 [FR] France ................ 91 03490

[51] Int. Cl.⁵ .................. F16H 45/02; F16D 3/50
[52] U.S. Cl. .................. 192/3.29; 192/106.2; 464/67
[58] Field of Search ............ 192/3.28, 3.29, 106.2; 464/66, 67

[56] References Cited

U.S. PATENT DOCUMENTS

| | | | |
|---|---|---|---|
| 4,002,228 | 1/1977 | Borman | 192/3.3 |
| 4,113,075 | 9/1978 | Walker | 192/3.31 |
| 4,735,297 | 4/1988 | Koshimo | 192/3.29 |
| 4,875,562 | 10/1989 | Fujimoto | 192/3.28 |
| 4,944,374 | 7/1990 | Casse et al. | 192/3.29 |
| 4,969,544 | 11/1990 | Fujimoto | 192/3.29 |

FOREIGN PATENT DOCUMENTS

| | | | |
|---|---|---|---|
| 2626053 | 7/1989 | France | 192/3.29 |
| 0200853 | 11/1983 | Japan | 192/3.29 |
| 8803621 | 5/1988 | PCT Int'l Appl. | |
| 8803622 | 5/1988 | PCT Int'l Appl. | |
| 8804000 | 6/1988 | PCT Int'l Appl. | |
| 9000690 | 1/1990 | PCT Int'l Appl. | |
| 2081401 | 2/1982 | United Kingdom. | |
| 2123924 | 2/1984 | United Kingdom. | |
| 2194835 | 3/1988 | United Kingdom. | |
| 2237357 | 5/1991 | United Kingdom. | |

*Primary Examiner*—Rodney H. Bonck
*Attorney, Agent, or Firm*—Longacre & White

[57] ABSTRACT

A lock-up clutch for a hydrokinetic power transmission apparatus comprises firstly a coupling element, and secondly a torsion damping device comprising two coaxial parts which are mounted for relative rotation of one with respect to the other against the action of circumferentially acting resilient members, with one of the said coaxial parts comprising two retaining members so shaped as to retain the resilient members in position. The coupling element constitutes one of the retaining members, by virtue of an outer flange formed for this purpose on its outer periphery. This outer flange is so shaped as to receive within it part of the resilient members in such a way that the coupling member constitutes a guide ring.

4 Claims, 4 Drawing Sheets

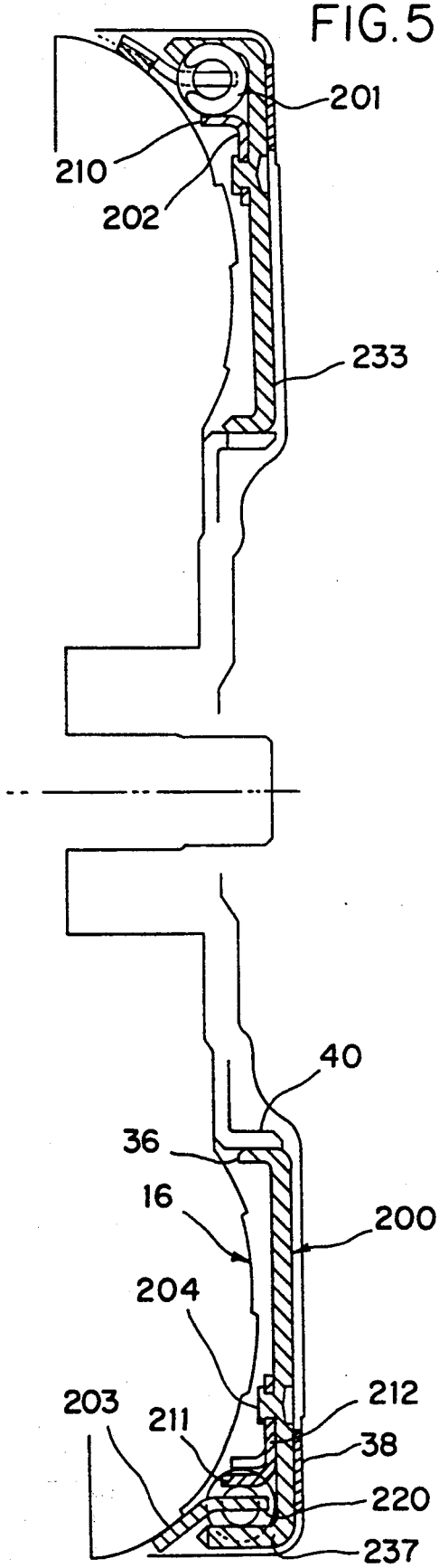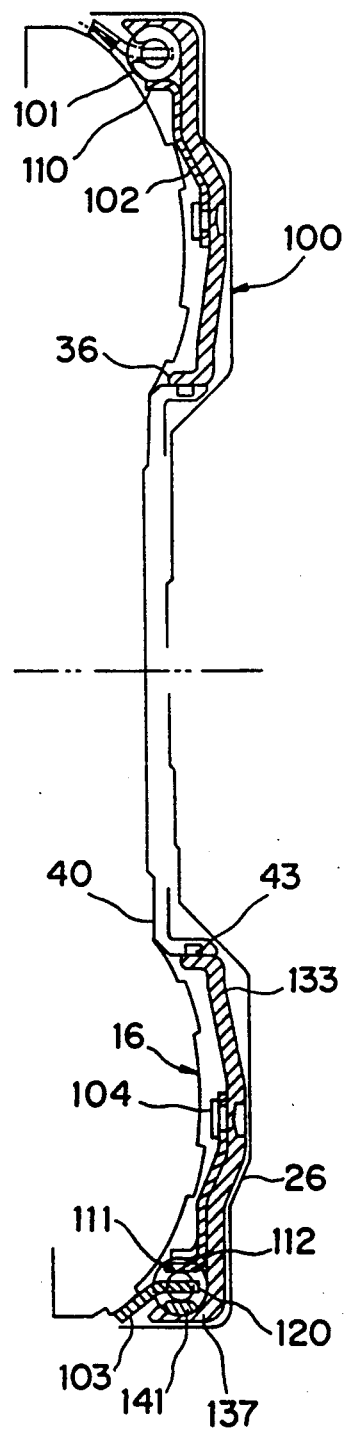

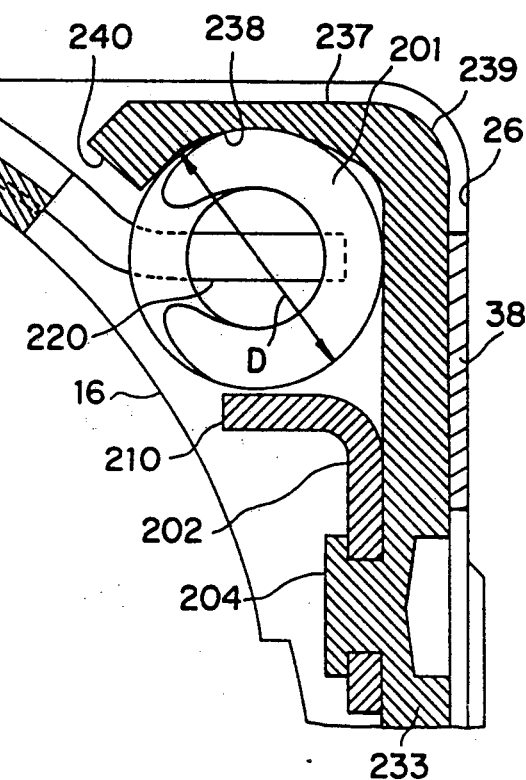
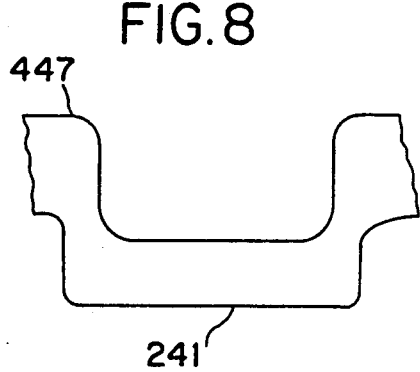
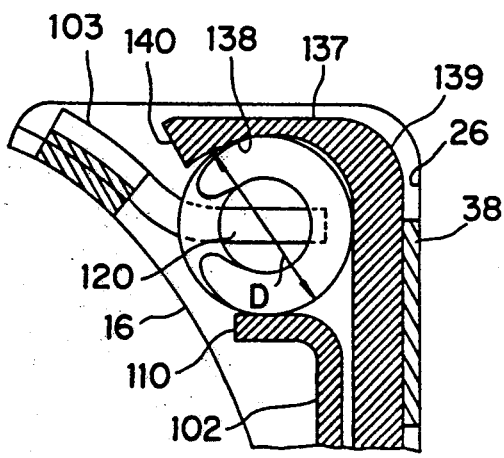
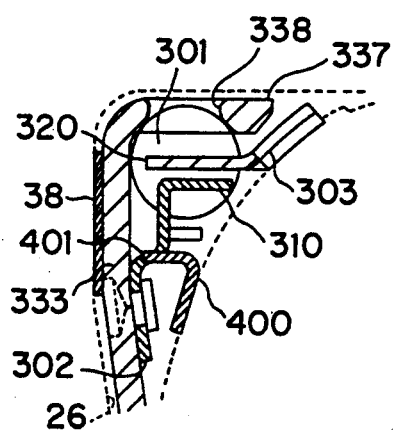

LOCK-UP CLUTCH FOR A HYDROKINETIC POWER TRANSMISSION APPARATUS FOR A MOTOR VEHICLE

FIELD OF THE INVENTION

This invention relates to hydrokinetic or fluid power transmission apparatus of the kind used, for example, on some types of motor vehicles having automatic or semi-automatic transmission. More particularly the invention relates to such apparatus in which a lock-up clutch is interposed between the turbine wheel and the casing wall opposed to the latter, for providing direct drive of the turbine wheel by the casing under certain operating conditions.

BACKGROUND OF THE INVENTION

Such an apparatus is described in the specification of U.S. Pat. No. 4,944,344 and the corresponding French published patent application No. FR 2 626 053A. Generally, a lock-up clutch includes firstly a coupling element which is adapted to act as a piston and to engage flat against the wall of the casing which faces towards the turbine wheel, when urged into that position by hydraulic pressure which is appropriately controlled for this purpose. The coupling element thus acts as a friction clutch plate locked up against the said wall of the casing. The lock-up clutch also includes an actuating device which is fixed to the coupling element for rotation therewith so as to drive it in rotation. This actuating means is itself adapted to be fixed in rotation to whatever driving element is coupled in rotation to the turbine wheel, usually the hub of the latter.

In the above mentioned United States and French patent specifications, the actuating means comprise a support plate, and the disclosures therein suggest the possibility of driving by a torsion damper comprising two coaxial parts which are mounted for rotation of one with respect to the other against the action of circumferentially acting resilient means.

Having regard to the problems of accommodating the apparatus, and particularly those concerned with its axial size, it is desirable to mount the actuating means of the lock-up clutch at the outer periphery of the turbine wheel, while at the same time ensuring that the resilient members are well guided.

DISCUSSION OF THE INVENTION

An object of the present invention is to satisfy these requirements by providing a novel torsion damping device for driving the coupling element which is arranged over a large circumference, while also ensuring proper guidance of the resilient members.

In accordance with the invention, there is provided a locking clutch for a hydrokinetic power transmission apparatus, of the kind comprising firstly a coupling element, which is adapted to act as a piston, and secondly, fixed to the said coupling element for rotation therewith, an actuating means for driving the said coupling element in rotation, wherein the actuating means for the coupling element consists of a torsion damper of the kind comprising two coaxial parts mounted for rotation of one with respect to the other against the action of circumferentially acting resilient members, with one of the said coaxial parts comprising two retaining members so shaped as to retain the said resilient members, characterised in that the coupling element constitutes one of the said retaining members by virtue of an outer flange with which it is provided for this purpose at its outer periphery, and in that the said outer flange is so shaped as to receive internally part of the circumferentially acting resilient members, in such a way that the said coupling element constitutes a guide ring.

The invention enables the resilient members to be fitted on a pitch circle or circumference having a large diameter, while providing good guidance for the resilient members because the coupling element itself constitutes a guide ring. In addition, the outer flange increases the rigidity of the piston.

Preferably, the inner periphery of the outer flange is recessed to receive the resilient members.

In one form of lock-up clutch according to the invention, the outer flange has a reduced thickness as compared with the main part of the coupling element. It is thus possible to bend the flange over first, and then to upset it outwardly using a forming roll, the exterior of the outer flange being finally machined, for example by turning, so as to reduce its thickness. The resilient members can thus be fitted on a pitch circle of very large diameter, which gives favourable conditions for a large relative angular displacement between the two coaxial rotatable parts of the torsion damping device.

According to another preferred feature of the invention, the recess in the outer flange is interrupted in order to form end stop portions for engaging the corresponding circumferential ends of the resilient members. These end stop portions act as spacers between each resilient member and the next, and may be applied by welding or may consist of lugs interrupting the outer flange and being of greater thickness than the latter.

According to a further preferred feature of the invention, the second rotatable part of the torsion damping device comprises an intercepting member having end stop lugs for the resilient members, these lugs being fixed directly on the turbine wheel and being disposed radially inwardly of the outer flange and oriented axially.

In accordance with yet another preferred feature of the invention, the coupling element directly carries the second retaining member, the latter having an axially oriented outer flange for retaining the resilient members at their inner periphery.

With these various arrangements, it is possible to provide end stop lugs fixed to the turbine wheel further inwards in the radial sense, with these lugs being adapted to cooperate, with a circumferential clearance, with an aperture formed in the second retaining member so as to positively limit the angular displacement between the two parts of the torsion damping device.

Various preferred embodiments of the invention will now be described, by way of example only and with reference to the accompanying drawings.

BRIEF DESCRIPTION OF THE DRAWINGS

FIG. 3 is a view in cross section taken on the line A—A in FIG. 2.

FIG. 4 shows the upper part of FIG. 3 on a larger scale.

FIGS. 5 and 6 are views similar to FIGS. 3 and 4 respectively, but showing a second embodiment of the present invention.

FIG. 7 is a view similar to FIG. 4, but shows a third embodiment of the invention.

FIG. 8 shows a detail of the outer flange of the coupling element in a fourth embodiment of the invention.

DESCRIPTION OF PREFERRED EMBODIMENTS OF THE INVENTION

Figure 1:
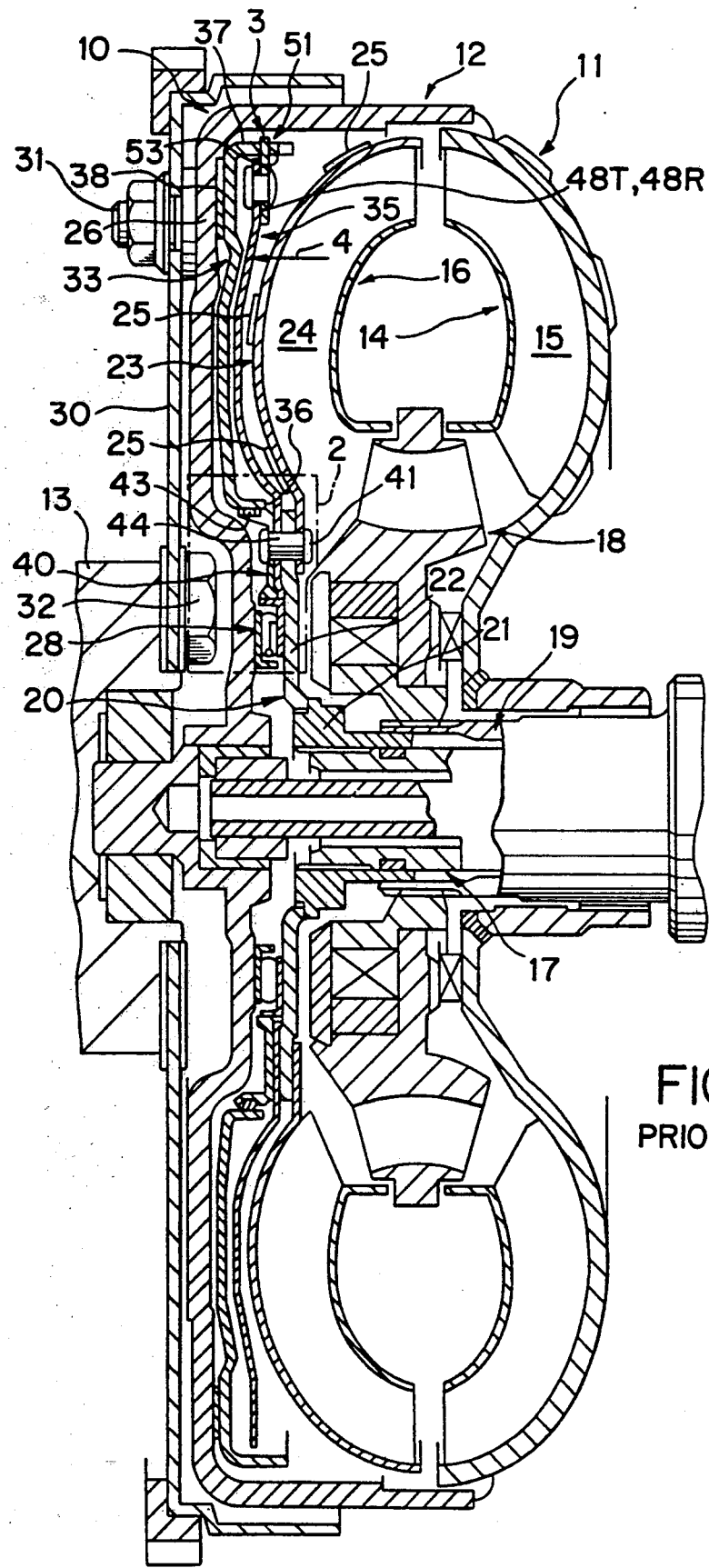
FIG. 1 is a view in axial cross section showing a lock-up clutch of the prior art.

As shown in FIGS. 2 to 8, the lock-up clutch in accordance with the present invention is intended to form part of a hydrokinetic power transmission apparatus. For simplicity, those elements that are common with those of the prior art (as disclosed in the specification of U.S. Pat. No. 4,944,374 and the corresponding French published application No. FR 2 626 053A, the disclosure of which is incorporated by reference in the present description) are given the same reference numerals in FIGS. 2 to 8 hereof. As far as the hydrokinetic apparatus itself is concerned, only its contour is indicated here.

Although the text of the above mentioned prior art specification is incorporated herein by reference, it will be useful to give a brief recapitulation of its disclosure so far as relevant to the present invention. With reference therefore to FIG. 1 hereof, the hydrokinetic power transmission apparatus 11 is for use in a motor vehicle and may for example consist of a torque converter. This torque converter comprises a casing 12, an impulse wheel 14, a turbine wheel 16, and a reaction wheel 18. The casing 12 is arranged to be coupled in rotation to the engine crankshaft 13 of the motor vehicle, and the impulse wheel 14, turbine wheel 16 and reaction wheel 18 are mounted within the casing 12. The impulse wheel 14 is coupled to the casing 12 for rotation with the latter, the vanes 15 of the impulse wheel being directly carried by the casing. The turbine wheel 16 is coupled to a second shaft 17 for rotation with it, this second shaft 17 being in this example the input shaft of the gearbox of the vehicle. The reaction wheel 18 is carried by the conventional fixed sleeve surrounding the driven shaft 17.

The turbine wheel 16 includes a hub 20, which includes a spigot 21 in its central portion whereby the hub is coupled with the driven shaft 17, for example by a splined coupling, so as to rotate with the driven shaft. The turbine wheel 16 also includes a generally toroidal body member 23, carrying corresponding vanes 24 and secured to the periphery of the hub 20, in this example by means of rivets 41. The turbine wheel vanes 16 are fastened to the body member 23 by means of lugs 25, which are bent over and/or upset so as to retain the vanes 24 in a suitable way.

An axial abutment member 28 is provided between the turbine wheel and the transverse wall 26 of the casing 12, so as to take the axial thrust. The casing 12 is secured to the driving shaft 13 (the engine crankshaft) for rotation with the latter, through a coupling plate 30 which is fastened to the casing 12 by means of studs 31 close to the outer periphery of the coupling plate 30. At its inner periphery, the coupling plate 30 is fastened by means of further studs 32 to the driving shaft 13. The lock-up clutch itself is indicated in FIG. 1 by the reference numeral 10, and is operatively coupled between the turbine wheel 16 and the casing wall 26.

As is well known, in operation the casing 12 and impulse wheel 14 are driven in rotation so as to create a circulation of a transmission fluid, which communicates rotary motion to the turbine wheel 16. When the wheels 14 and 16, at starting, rotate in different speed ranges, the reaction wheel 18 causes the torque to be increased, while subsequently, when the impulse wheel 14 and turbine wheel 16 have begun to rotate at equal speeds, the reaction wheel 18 (which is stationary up until then) rotates in unison with the other two wheels 14 and 16.

It is in order to limit sliding movement between the impulse wheel 14 and turbine wheel 16 that the lock-up clutch is provided. It includes a coupling element 33. Under the control of the oil under pressure which is present in the casing 12, this coupling element 33 bears hard against the casing wall 26 in certain operating modes, so as to transmit motion directly from the driving shaft 13 to the driven shaft 17.

The lock-up clutch comprises the coupling element 33 and an actuating device for the latter, the coupling element being arranged to operate as an axially movable piston.

The integral coupling element 33 is shown in all the Figures of the accompanying drawings in the general form of a flat annular plate of pressed sheet steel. It has a first axially oriented annular flange 36 at its inner periphery, and a second axially oriented annular flange, or outer flange (37 in FIG. 1) at its outer periphery. Both flanges 36 and 37 are directed away from the casing wall 26. The coupling element carries an annular friction liner 38 on its back face directed towards the casing wall 26. The friction liner 38 is located close to the outer periphery of the coupling element 33, for contact with the casing wall 26 so as to couple the element 33 and wall 26 together by friction.

The coupling element 33 is engaged in axial sliding movement, through its first flange 36, with an annular member 40 which is secured to the support plate 22 of the hub 20, for example by welding or (as seen in FIG. 1) by means of the rivets 41. This annular member 40 acts for centring and guiding the coupling element 33, so as to serve as a support hub for a sealing element 43 for the coupling element 33. The actuating means for the latter, mentioned above, comprises a radial plate 35 in FIG. 1.

It should be noted that in the embodiments of the present invention shown in FIGS. 2 to 6, this radial plate 35 is omitted, being replaced by a torsion damping device which is preferably adapted to be coupled in rotation to the turbine wheel 12.

Referring generally to FIGS. 2 to 8, these show a lock-up clutch which is essentially of the kind described above, in which the actuating means for the coupling element consists of a torsion damping device of the kind comprising two coaxial parts which are mounted for rotation relative to each other against the action of circumferentially acting resilient means, with one of the two said coaxial parts comprising two retaining members so shaped as to hold the said resilient members in position. This clutch is characterised in that the coupling element (which is indicated variously in those Figures by the reference numerals 133, 233 and 333) constitutes one of the retaining members through an outer flange which is indicated in FIGS. 2 to 8 variously by the reference numerals 137, 237, 337 and 447. This outer flange is provided for this purpose at the outer periphery of the coupling element. The clutch is further characterised in that the outer flange is so shaped as to receive, partly internally, the circumferentially acting resilient members 101, 201 or 301, in such a way that the coupling element acts as a guide ring.

Figure 2:
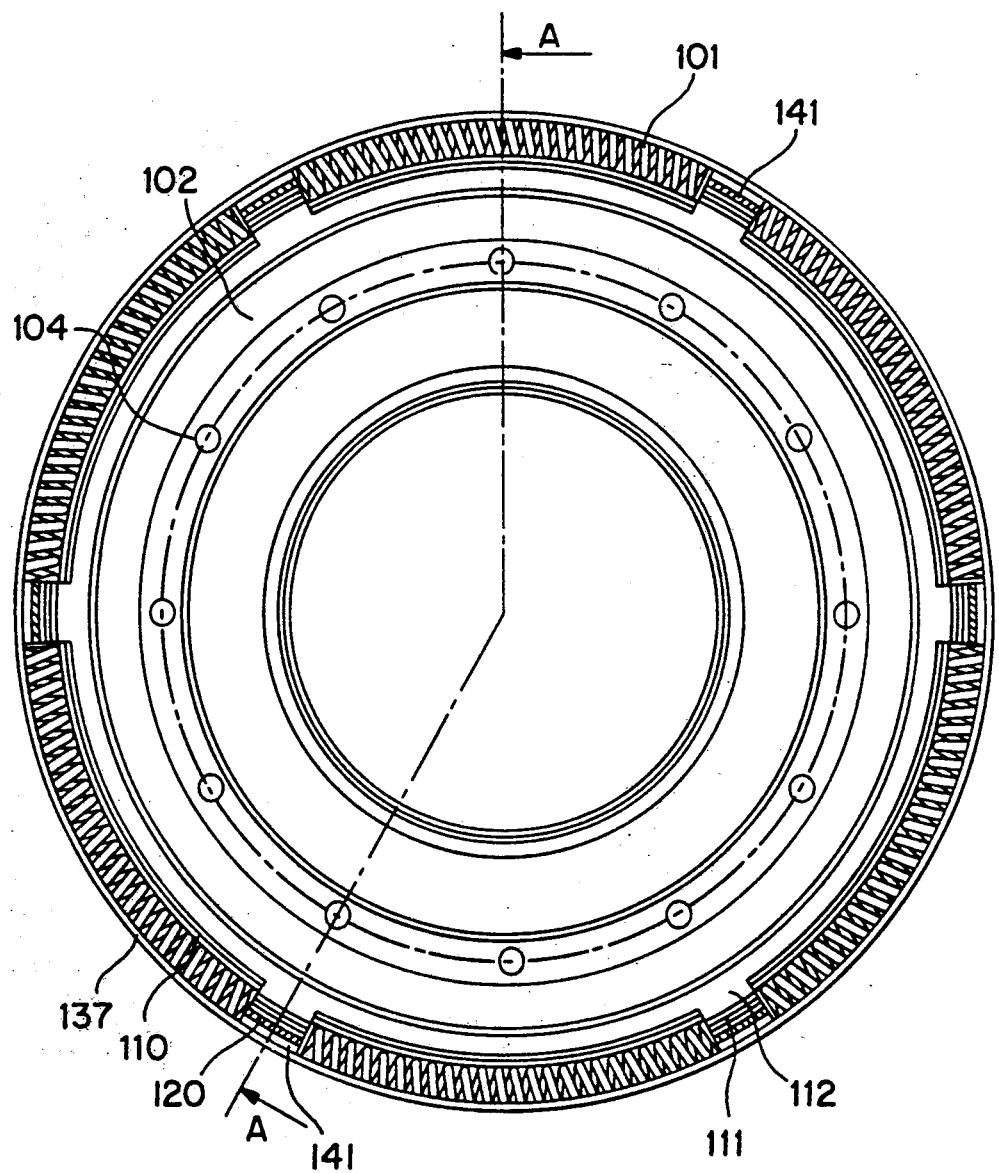
FIG. 2 is a view in elevation showing part of the lock-up clutch in accordance with the present invention.

More precisely, and referring in particular to FIGS. 2 to 4, the inner periphery of the outer flange 137 is recessed for receiving the resilient members 101. The outer flange 137 has a reduced thickness as compared with the transversely oriented main portion of the coupling element 133 that carries the friction liner 38. The outer flange 137 is continuous, being joined to the main portion of the coupling element 133 through a bend 139 and having a chamfered free end 140. The recess on the inner side of the outer flange 137, indicated in FIG. 4 at 138, is such that it receives part of the resilient members 101, and more particularly the outer periphery of the latter. In the present example, the members 101 are in the form of a plurality of coil springs which are spaced at regular intervals around a common pitch circle, which, in this example, is of large diameter as can be seen from FIG. 2.

In order to obtain the largest possible diameter, the outer flange 137 is made in the following way.

First, starting with a flat sheet steel blank, the blank is locally bent at its outer periphery to form the bend 139. With the aid of a suitable tool, which in this example is a forming roll, the hollow recess 138 is then formed by upsetting the flange 137 outwardly so that it adopts a bulged cross section. The radially outer side of the flange 137 is then machined, for example by a turning operation, so as to reduce its thickness. This machining operation extends partly into the bend 139.

The spring 101, the diameter of which is indicated in FIG. 4 as D, is thus able to come into local contact with the recess 138 close to the chamfered free end 140 of the outer flange, and also locally (close to the bend 139) into contact with the main portion of the coupling element or piston 133. The latter thus encloses the springs 101 and acts as a guide ring for them. Accordingly the coupling element 133 retains the springs in position both axially and radially.

On their radially inner side, the springs are supported by means of a second retaining member 102, which has for this purpose at its outer periphery an axially oriented annular flange 110. The springs 101 are thus retained externally by the flange 137, being guided by the latter, and internally by the flange 110, the diameter of which is of course smaller than that of the flange 137. Under the action of centrifugal force the springs 101 are urged into contact with the recess 138, while in the stationary condition they are prevented from falling inwards by the flange 110.

In a preferred arrangement, the retaining member 102 is carried by the coupling member 133. To this end the latter has local deformations 104, which are spaced apart at regular intervals on a common pitch circle so as to define axially oriented projections in the form of integral rivets 104. These rivets 104 extend through the member 102 and are upset to secure the latter in position. The second retaining member 102 is thus secured sealingly to the piston 133 by the rivets 104. Alternatively, the member 102 could of course be welded to the coupling element 133.

It will be noted that the members 133 and 102 together constitute a sub-assembly with the springs 101. The coupling element 133 also carries end stop members 141 (FIG. 2) between the springs 101. These end stop members are, as shown in FIG. 2, in the form of spacing lugs which are welded inside the continuous outer flange 137. These spacing lugs are offset radially inwardly from the latter, and extend circumferentially between each pair of springs 101 so as to engage the circumferential ends of the springs. The lugs 141 interrupt the recess 138, which is thus divided into a plurality of seating portions. The end stop lugs 141 thus alternate with the seating portions of the recess 138 for retaining the springs 101 circumferentially.

The second retaining member 102 is also formed with axially oriented end stop lugs, indicated at 111 in FIG. 2 and corresponding with the end stop lugs 141 as shown in FIG. 3. The circumferential widths of the lugs 111 and 141 are the same, with the lugs 111 being offset radially inwards from the outer flange 110 of the inner retaining member 102, the outer flange 110 being thus interrupted locally. More precisely, the lugs 111 are formed by locally bending back axially a plurality of radial projections 112 which project outwardly from the outer flange 110, locally interrupting the latter.

The second part of the torsion damper comprises a comb-shaped interception member 103, with a plurality of end stop lugs 120 for the springs 101. This is best seen with reference to FIGS. 2 and 4. In this example, the interception member 103 is secured by welding to the turbine wheel 16. In a modification, the turbine wheel and interception may be inter-engaged by deformation. The interception member 103 is secured to the outer periphery of the turbine wheel 16, and its end stop lugs 120 extend further inwards in the radial direction. They are oriented generally axially, and are interposed radially between the outer flange 137 of the member 133 and the outer flange 110 of the retaining member 102, with these flanges thus extending radially on either side of the end stop lugs 120. The lugs 120 also extend radially into the middle part of the springs 101, symmetrically between the lugs 141 and 111 (see FIG. 3). They are of the same circumferential width as the lugs 111 and 141, and are circumferentially interposed between two ends of two consecutive springs 101.

Thus, during relative angular displacement between the two coaxial parts of the torsion damper, namely the first part comprising the coupling element 133 and the retaining member 102, and the second part consisting of the interception member 103, the springs 101 are compressed between the lugs 111 and 141 on the one hand, and 120 on the other. It will be noted that in operation, the coupling element 133, together with the second retaining member 102, is displaced axially with respect to the lugs 120, with the springs 101 following this movement due to the fact that they are confined between the members 102 and 133 and retained axially by the hollow seatings in the recess 138.

The present invention is of course not limited to the embodiment described above with reference to FIGS. 2 to 4. For example, and referring to FIGS. 5 and 6, whereas in FIG. 3 the second retaining member 102 has a bent form as seen in cross section, it is possible to locate this member in the manner shown in FIG. 5. In FIG. 5 this retaining member is indicated by the reference numeral 202, and is located further outwardly, with the rivets 204 of the coupling element, 233, being therefore radially offset further outwardly. The retaining member 202 is thus of more simplified form than the retaining member 102 in the first embodiment.

The lock-up clutch 200 shown in FIGS. 5 and 6 is of generally the same configuration as the clutch 100 in FIG. 3, with its second or inner retaining member 202 again having an outer flange, 210, together with end stop lugs 211 projecting from lugs 212. The outer radial flange 237 of the coupling element 233 includes lugs 241 as in FIG. 3. In this example the lugs 241 project from the element 233, being bent out axially from their initial state coplanar with the transverse wall of the coupling element 233 before final machining of the flange 237. The lugs 241 interrupt the outer flange 237, and are thicker than the latter, extending radially beyond the inner periphery of the outer flange 237. More precisely, the flange 237, interrupted by the lugs 241 which are then transverse, is formed by axially upsetting the flange 237, after which the material of the latter is reformed using a forming roll in order to form the seating recesses. The lugs 241 are then bent axially, to extend inwardly with respect to the outer flange 237. Finally, the outer periphery of the outer flange 237 is machined. It will be realised that the number of components of the torsion damper is thereby reduced.

Still with reference to FIGS. 5 and 6, the interception member 203 of the second retaining member of the torsion damper is again fixed on the turbine wheel 16, and again has end stop lugs 220. It will be noted that the seating recesses 238 in the outer flange 237 embrace the outer periphery of the springs (201), over a larger segment, the free end 240 of the flange 237 being bent down so as to constitute a retaining lip. The springs 201, again having the diameter D, are brought into contact with the transverse part of the coupling element 233 close to the bend 239.

Reference is now made to FIG. 7. Whereas, in the embodiments of the invention described with reference to FIGS. 2 to 6, the outer flange 237 was closed at the level of the seating recesses 138 or 238, in FIG. 7 the outer flange, 337, of the coupling element, 333, is recessed in such a way that the seating recesses 338 extend through the whole thickness of the flange 337. In this way they form windows in the flange 337 for receiving the outer periphery of the springs, 301. These windows alternate with integral portions of the flange 337 which act as end stop elements, in the same way as the lugs 141 or 241 in the previous embodiments. In the present case there is no need to reduce the thickness of the springs 301.

In the further modification illustrated in FIG. 8, local recesses are formed by pressing in the outer flange, 447, of the coupling element, instead of providing the lugs 141 or 241. Thus in this case the outer flange 447 is continuous and of a wavy form.

As will be understood from the foregoing description and from the drawings, the interception member 103 or 203 is fixed to the outer periphery of the turbine wheel 16, generally radially at the level of the outer flange 137, 237 or 337 of the coupling element. This makes more internal space available, so that it becomes possible to locate the end stop elements further inwardly in the radial sense. As can be seen in FIG. 7, these end stop elements 400 are secured to the turbine wheel 16, and comprise end stop lugs 401 which are oriented axially and which are adapted to penetrate with a circumferential clearance into apertures 321 formed in the second or inner retaining member 302, thus limiting the angular displacement between the two coaxial parts of the torsion damping device. Accordingly the angular displacement between the two coaxial parts, 333, 302 on the one hand, and 303 on the other hand, is positively limited by these lugs 401 coming into engagement with the appropriate lateral edges of the generally slot-shaped aperture 321. The lugs 401 can of course all be joined together, the end stop elements 400 being part of a ring.

Finally, the interception member 103 or 203 may be divided, consisting then of a plurality of members which are secured locally to the turbine wheel 16, with each of these members carrying a lug 120 or 220.

What is claimed is:

1. A lock-up clutch for a hydrokinetic power transmission apparatus, comprising an annular coupling element, means coaxially mounting the coupling element for piston-like movement of the latter, and actuating means for driving the coupling element in rotation, wherein the actuating means comprise a torsion damping device which itself comprises a first rotatable part, a second rotatable part, circumferentially acting resilient means operatively disposed between said first and second rotatable parts, and means mounting said rotatable parts for relative rotation of one with respect to the other against the action of said resilient means, said first rotatable part comprising a first retaining member and a second retaining member associated with the first retaining member for retaining said resilient means in position, said coupling element having an outer flange at its outer periphery, the outer flange of the coupling element constituting said first retaining member, said outer flange being so shaped as to receive said resilient means partly within it, whereby the coupling element constitutes a guide ring and said second retaining member is carried by the coupling element wherein the inner periphery of the outer flange is recessed to receive the outer periphery of said resilient means, and said coupling element comprises a main portion and said outer flange integrally formed with the main portion, the thickness of the outer flange being less than that of the main portion.

2. A clutch according to claim 1, wherein the coupling element further includes end stop portions interposed between the resilient members for engaging the circumferential ends of the latter, the said end stop portions interrupting the internal recess in the outer flange.

3. A clutch according to claim 2, wherein the said end stop portions comprise axially oriented tabs of the coupling element, interrupting the outer flange and being of greater thickness than the latter.

4. A clutch according to claim 1, wherein the second retaining member is formed with a plurality of apertures, the torsion damping device further including at least one end stop member having abutment lugs for cooperating with the said apertures and defining with the latter a circumferential clearance, whereby to limit the angular displacement between the two said parts of the damping device, the apparatus further including a turbine wheel and the said end stop member being fixed to the turbine wheel.

* * * * *